United States Patent [19]
Fujikawa et al.

[11] Patent Number: 5,446,555
[45] Date of Patent: Aug. 29, 1995

[54] DESIGN DRAWING TRANSMISSION SYSTEM

[75] Inventors: Koji Fujikawa; Kazuo Shibata; Kenshi Katayama; Masahiko Yamamoto, all of Tokyo, Japan

[73] Assignee: Nippon Steel Corporation, Tokyo, Japan

[21] Appl. No.: 192,804

[22] Filed: Feb. 7, 1994

Related U.S. Application Data

[63] Continuation of Ser. No. 633,335, Dec. 27, 1990, abandoned.

[30] Foreign Application Priority Data

Dec. 28, 1989 [JP] Japan ................................ 1-342387

[51] Int. Cl.⁶ .............................................. H04N 1/00
[52] U.S. Cl. .................................... 358/406; 358/400
[58] Field of Search ............... 358/400, 403, 404, 405, 358/406, 437–439; H04N 1/00; 395/147, 162

[56] References Cited

U.S. PATENT DOCUMENTS

| | | | |
|---|---|---|---|
| 4,849,815 | 7/1989 | Streck | 358/471 |
| 4,954,887 | 9/1990 | Ono | 358/467 |
| 5,003,495 | 3/1991 | Thibadeau et al. | 364/521 |
| 5,061,916 | 10/1991 | French et al. | 358/400 |

FOREIGN PATENT DOCUMENTS 3-201763  9/1991  Japan .
5-216720  8/1993  Japan .

Primary Examiner—Edward L. Coles, Sr.
Assistant Examiner—Kim Yen Vu
Attorney, Agent, or Firm—Pollock, Vande Sande & Priddy

[57] ABSTRACT

A design drawing transmission system comprises a design drawing transmission device including a scanner for reading a design drawing drafted on a recording sheet and a transmitter for transmitting drawing information including the image signal prepared by the scanner through a predetermined path, and a design drawing receiving device including a receiver for receiving the drawing information transmitted through the transmission path, a memory for storing the drawing information received by the receiver and a plotter for reading out the drawing information stored by the memory and reproducing the design drawing on a recording sheet on the basis of the image signal included in the drawing information.

32 Claims, 1 Drawing Sheet

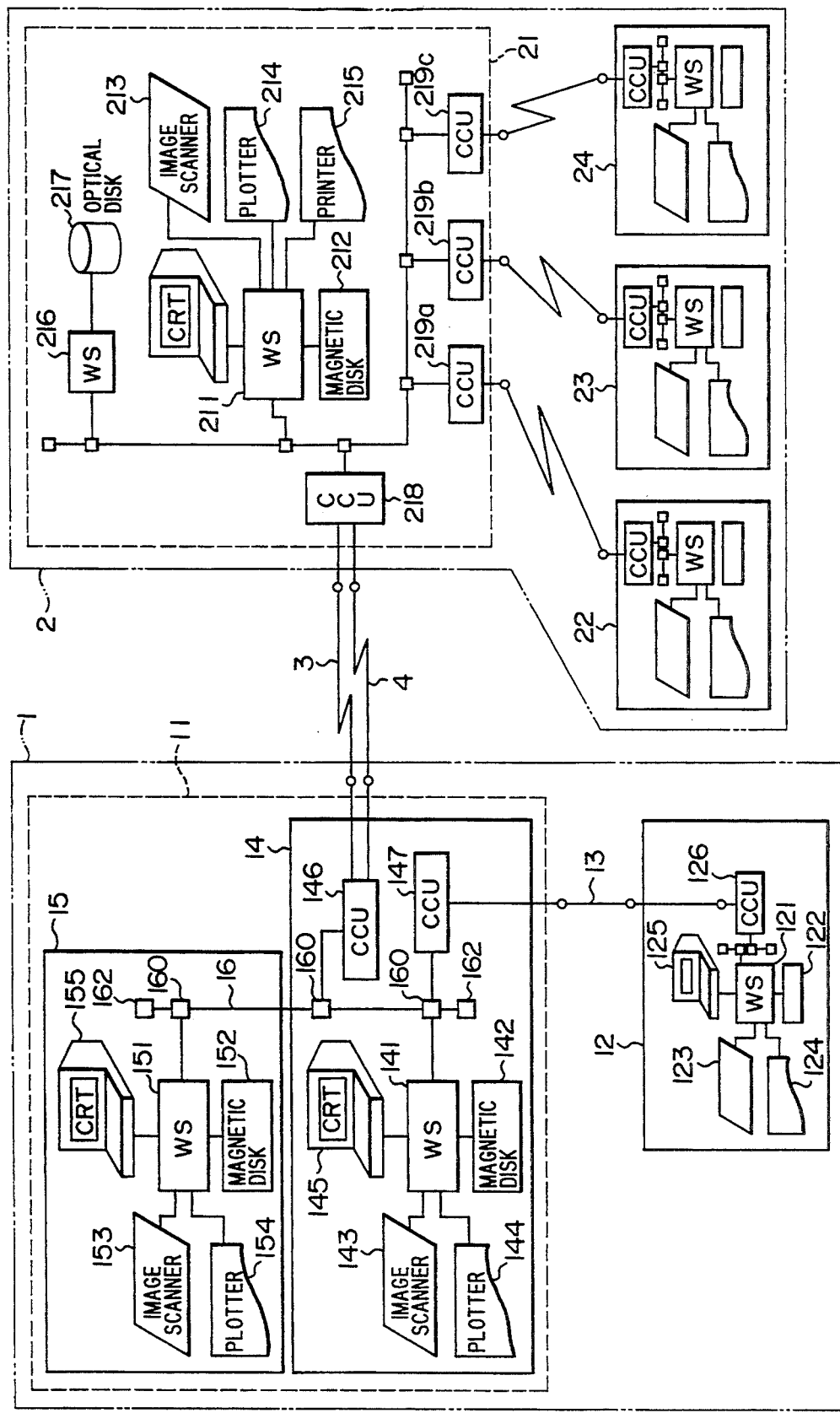

DESIGN DRAWING TRANSMISSION SYSTEM

This application is a continuation of application Ser. No. 07/633,335 filed Dec. 27, 1990, now abandoned.

BACKGROUND OF THE INVENTION

1. Field of the Invention

The present invention relates to a design drawing transmission system for transmitting a design drawing through a communication line and exactly printing an exact reproduction on a receiving side of the communications line.

2. Description of the Related Art

Conventionally, in cases where a design drawing is to be used commonly among plural factories, or where a design division is located in Japan and a production factory is located abroad, if any modification is made to the design drawing, the revised version of the design drawing is mailed to receiving parties.

However, it takes a long time to mail the design drawing so that if the design modification is frequently made, mailing of the design drawing is very inconvenient. Further, a system is proposed in which design modification is carried out by transmitting the data prepared by a CAD (Computer Aided Design) system, which is a design system using a computer, through a communication line. However, this system also has problems such that the same CAD system must be also installed on the side of factory, resulting in the entire system being too large or if different CAD systems are introduced into respective factories, data cannot be shared by these factories so that the modification to the design drawing cannot be made rapidly. Thus, a more simplified design drawing transmission system has been greatly demanded.

Incidentally, a drawing can be transmitted through a facsimile machine. A prevailing facsimile machine, however, can only transmit a drawing up to A3 size so that it is not suitable to transmit the design drawing. Further, a transmitted drawing and a received drawing are not always in one-to-one correspondence. For this reason, the facsimile machine is not suitable to transmit the design drawing which is required to have exact dimensions.

Furthermore, in the case where a design drawing is transmitted between the different countries such as between Japan and U.S.A., a transmission side reads a design drawing by a drawing read means to prepare an image signal indicative of the drawing and transmits the image signal and a receiving side receives the image signal and reproduces the original design drawing by a drawing reproduction means. In this case, any disagreement in standard or characteristics between the drawing read means on the transmission side and the drawing reproduction means on the receiving side may give rise to unallowable errors in dimensions between the reproduced design drawing and the original design drawing due to the difference between the reading characteristics and the reproduction characteristics. Actually, this dimension error should be less than 0.5 mm (preferably 0.3 mm) per 1000 mm. But the above difference can provide a dimension error upto 20 mm per 1000 mm which is much lower than the desired accuracy.

SUMMARY OF THE INVENTION

A main object of the present invention is to provide a design drawing transmission system which can exactly transmit a design drawing through a simple arrangement.

Another object of the present invention is to provide a design drawing transmission system which, if there is a characteristic difference between a drawing read means on a transmission side and a drawing reproduction means on a receiving side, can modify the reproduction characteristic of the reproduction means on the receiving side to reproduce a design drawing with an error within a predetermined allowable range from an original design drawing.

In order to attain the above objects, a design drawing transmission system according to the present invention comprises a design drawing transmission device having image reading means for reading the design drawing drafted on a recording sheet and producing an image signal, and transmission means for transmitting drawing information including the image signal produced by the image reading means through a predetermined transmission path, and a design drawing receiving device having receiving means for receiving the drawing information transmitted through the transmission path, storage means for storing the drawing information received by the receiving means, and output means for reading out the drawing information stored by the storage means and reproducing the design drawing on a recording sheet on the basis of the image signal included in the drawing information.

In a preferred embodiment of the present invention, a design drawing transmission system comprises a design drawing transmission device having image reading means for reading the design drawing drafted on a recording sheet and producing an image signal, characteristic adding means for adding characteristic information indicative of a characteristic of the image reading means to the image signal produced by the image reading means thereby to prepare drawing information and transmission means for transmitting the drawing information prepared by the characteristic adding means through a predetermined transmission path, and a design drawing receiving device having receiving means for receiving the drawing information transmitted through the transmission path, storage means for storing the drawing information received by the receiving means, output means for reading out the drawing information stored by the storage means and reproducing the design drawing on a recording sheet on the basis of the image signal included in the drawing information and means for modifying on the basis of the characteristic information included in the drawing information a reproduction characteristic in reproduction of the image signal by the output means.

BRIEF DESCRIPTION OF THE DRAWING

FIG. 1 is a block diagram showing the arrangement of one embodiment of a design drawing transmission system according to the present invention.

DESCRIPTION OF THE PREFERRED EMBODIMENTS

Now one embodiment of the present invention will be explained with reference to the drawing.

FIG. 1 is a diagram for explaining the arrangement of one embodiment of a design drawing transmission system according to the present invention.

In the case where factories or the like are located in two areas distant from each other such as in Japan and the U.S.A., this system is adapted to transmit a design drawing from a factory, a research institute, etc. (hereinafter referred to as a site) in charge of design work to another site in the same or different area.

When international division of labor advances like today, design sections are frequently collected at one location such as a technical center whereas production fields are located at areas adjacent to markets or with low labor cost. The demand of accurately transmitting a design drawing by a transmission system as mentioned above is very high.

In FIG. 1, the system according to one embodiment of the present invention is divided into a first area (e.g. Japan) 1 and a second area (e.g. U.S.A.) 2 which are connected through an international communication line 3.

Sites 11 and 12 are located in the first area 1. Specifically these sites 11 and 12 are located at regions, such as different states and prefectures, far distant from each other within the same area. The sites 11 and 12 are connected with each other through a domestic communication line having a data rate of 9600 bps. The site 11 is a technical center including research, development and design sections. A design facility 14 and a factory facility 15 are located in the same yard of the site 11 and they are connected by a local area network (LAN) 16 such as Ethernet. A work station (WS) 141 for designwork of a product through CAD is located within the design facility 14. The work station 141 is connected with a magnetic disk device 142 which is a storage means for temporarily storing a design drawing, an image scanner 143 of A0 size for reading the design drawing, a plotter 144 for outputting the design drawing to be printed out on a sheet of paper of A0 size and a CRT 145 which is a display means for displaying the design drawing designed by the work station 141. Further, in order to transmit the design drawing to the other site, CCU's (communication control units) 146 and 147, each of which is connected with the LAN 16 through a transceiver 160, are provided for connecting the communication line to the LAN. The LAN 16 is terminated with terminators 162.

The individual devices constituting this system such as the work station 141, the magnetic disk device 142, the image scanner 143, the plotter 144, the CRT 145, and CCU's 146 and 147 are commercial units and housed in different cases. For example, the work station 141 may be an engineering work station available from SUN Corporation; the image scanner 143 may be an A0 scanner 4750 available from TOYO DENKI SEIZOU Co., Ltd. or an A0 scanner 4240 available from VIDAR Corporation; the plotter 142 may be an A0 electro-static plotter of 5700 series available from Calcomp Corporation; and the CCU may be a personal computer PS-2 model 50Z available from IBM Corporation provided with a communication board.

In the factory facility 15, a work station 151 is provided for management of the factory. The work station 151 is connected with a magnetic disk device 152, an image scanner 153, a plotter 154 and a CRT 155.

The design drawing prepared through CAD within the design facility 14 is stored in the magnetic disk 142 so that it can be reproduced by the plotter 154 by access thereto from the work station 151 in the factory facility 15 through the LAN 16. Further, a drawing once prepared by the plotter 144 and corrected by handwriting or the like is read by a scanner 143 and converted into an image signal, which is in turn stored in the magnetic disk device 142. Thereafter, this image signal is sent to the factory facility 15 through the LAN 16, and reproduced by the plotter 154. Such a communication system can be realized by a multiple-address communication system using a personal computer-facsimile connection as disclosed in e.g. JP-A-59-221068.

A work station 121 is also provided for management of the factory in the site 12 like in the factory 15. The work station 121 is connected with a magnetic disk device 122, an image scanner 123, a plotter 124, a CRT 125 and a CCU 123. The software program of the CAD system installed in the work station 121 within the site 12 is different from that of the CAD system installed in the work station 141 within the site 11 so that access to the magnetic disk device 142 from the work station 121 through the communication line 13 cannot reproduce a design drawing. When the design drawing is to be transmitted from the site 11 to the site 12, the design drawing stored in the magnetic disk 142 is read out and reproduced by the plotter 143. The drawing thus reproduced is read by the scanner 143 and converted into an image signal. This image signal is transmitted to the site 12 through CCU 147 and the communication line 13.

In the site 12, the image signal received is stored in the magnetic disk device 122. The reception of the image signal indicative of the drawing is completed, the work station 121 displays on the CRT 125 the fact that the reception of the image signal, i.e. its storage has been completed. Looking at the display on the CRT 125, an operator may issue through a suitable operation a command for reproduction of the drawing. Upon detection of this reproduction command signal, the work station 121 reproduces the image information stored in the magnetic disk device 122 by the plotter 124.

Located in the second area 2 are a site 21 which is a main factory in the second area and serves as a main communication office for other factories, and sites 22, 23 and 24 serving as subservient offices.

The sites 22, 23 and 24 each has the same arrangement as the site 12 and are connected with the site 21 through domestic communication lines 25, 26 and 27.

A work station 211 is located in the site 21 as in the site 11. The work station 211 is connected with a magnetic disk device 212, an image scanner 213, a plotter 214 and a printer 215. Further located in the site 21 are a CCU 218 which is connected with the CCU 146 in the first area 1 through the international communication line 3 of 48 Kbps and the international communication line 4 of 9600 bps, and CCU's 219a, 219b and 219c through which the site 21 is connected with the sites 22, 23 and 24, respectively.

The international communication line 3 has a communication rate of 48 Kbps or 64 Kbps whereas the domestic communication lines 13, 25, 26 and 27 have a communication rate of 9600 pbs.

The data transmitted through the international communication line 3 are allotted to CCU's 219a, 219b and 219c through the CCU 218 in accordance with destination sites, and transmitted to these destination sites 21, 22, 23 and 24.

However, the communication line 3 is different in communication rate from the communication lines 25, 26 and 27. Therefore, if the data are directly transmitted from the site 11 to the sites 21, 22 and 23, the communication rate should be determined depending on the communication line of a lower communication rate, thus providing high communication cost. In this system, therefore, when communication is made between the areas 1 and 2, the received data is stored in the magnetic disk device 212 through the CCU 218 in the work station 211 serving as a server. And after the reception of the data has been completed, the data are read out from the magnetic disk device 212 and transmitted to the sites 22, 23 and 24 through the CCU's 219a, 219b and 219c.

Also when a design drawing is to be simultaneously transmitted to a plurality of sites 22, 23 and 24, the image signal is stored in the magnetic disk device 212 in the site 21 and thereafter transmitted to the individual sites 22, 23 and 24.

The site 21 is provided with a work station serving as a drawing server and an optical disk filing device 217 such as 'Hit File' available from HITACHI Ltd. The drawings to be used repeatedly are previously stored in this optical disk 217 so that the individual sites 22, 23 and 24 can access the drawings.

The respective devices in the first area 1 and the second area 2 are adapted to different domestic specifications so that the respective plotters may provide different printing densities DPI (Dots per Inch). If the specifications are different like this, the design drawing reproduced by printing out the image signal received by the receiving side in accordance with the invention has a dimension error of about 2% with respect to an original design drawing. Actually, this error is desired to be less than 5%, preferably 3%. Therefore, the image signal read out from the magnetic disk device 212 by the work station 211 are subjected to data conversion so as to adapt to the printing density of the plotter in the first area 1 by means of measures of thinning-out, saving, etc. Necessity of this conversion can be judged by transmitting characteristic information representative of the reading accuracy, e.g. distinction between 16 dots/mm and 400 dots/inch, of the image scanner 143 for reading the design drawing which is added to the signal indicative of a design drawing in the work station 141 on the transmission side. For example, if the reading accuracy of the image scanner 143 is 16 dots/mm and the recording accuracy of the plotter 214 is 400 DPI (dots/inch), there exist six redundant dots/inch so that the received data is thinned out partially at this rate.

In the case where such a design drawing has been transmitted between the sites, the transmission site must confirm that the design drawing has been correctly transmitted to the destination site. Therefore, the receiving side sends a signal indicative of completion of reception (completion signal). If the transmission side and the receiving side are directly connected with each other, the completion signal will reach the transmission side without failure. However, in the case of communication between the areas as described above, the site 11 is not directly connected with the sites 22, 23 and 24 so that the completion signal will be sent from the sites 22, 23 and 24 to the site 21. Therefore, the site 11 serving as a transmission source cannot confirm that the design drawing transmitted by itself has reached the sites 22, 23 and 24. Then, the CCU 218 controlling the communication between the site 11 and the sites 21 transfers the completion signal received from the sites 22, 23 and 24 to the site 11. Thus, the site 11 serving as a transmission source can confirm that the design drawing transmitted by itself has correctly reached the sites 22, 23 and 24.

The first area 1 and the second area 2 are connected with each other through the communication line 4 for back-up as well as the international communication line 3. When the international communication line 3 is broken down, the signal will be transmitted through the backup communication line 4. Usually, the backup communication line 4 has a transmission rate lower than that of the international communication line 3.

In accordance with this embodiment, the image scanner 143, and the plotters 154, 124, 214, etc., are adaptable to the widthwise reading and recording abilities corresponding to the size of the design drawing used in the factory to which they belong, so that a system for transmitting a design drawing does not take the limitation on the size of a recording sheet into consideration, unlike the conventional facsimile. Further, also in the case where the size of the design drawing is changed to a larger size, it is possible to readily modify the system only by replacing the image scanners and the plotters. In this case, the devices constituting the system of the present invention such as a work station, magnetic disk device, image scanner, printer and CCU are commercial units and housed in the individual cases so that an optimum system can be constructed for each site. As the case may be, some of the devices of this system may be used in common with a CAD system, and the modification of the system is also easy.

Further, the design drawing transmission system is interlinked with the CAD system so that the design drawing can be prepared through CAD, and the prepared drawing is converted into an image signal and then transmitted. Thus, the design drawing can be transmitted rapidly between factories having CAD's of different specifications and also some modifications required for the design drawing can be made rapidly.

We claim:

1. A design drawing transmission system comprising:
a design drawing transmission device at a first facility including image reading means for reading a design drawing prepared on a recording sheet and producing an image signal, transmission means for transmitting drawing information including characteristic information indicative of characteristics of the image reading means identifying the reading accuracy of the reading means, and the image signal produced by said image reading means through a predetermined transmission path;
a design drawing receiving device at a second facility including receiving means for receiving the drawing information transmitted through said transmission path, storage means for storing the drawing information received by said receiving means, output means for reading out the drawing information stored by said storage means and reproducing the design drawing on a recording sheet on the basis of the image signal included in said drawing information under control of the characteristic information included in said drawing information which minimizes dimensional errors in a reproduced design drawing.

2. A design drawing transmission system according to claim 1, wherein said design drawing receiving device further comprises confirmation means for confirming that said drawing information has been stored in said storage means.

3. A design drawing transmission system according to claim 1, wherein said design drawing receiving device further comprises means for modifying a reproduction characteristic in reproduction of said image signal included in said drawing information by said output means on the basis of said characteristic information included in said drawing information transmitted by said transmission means.

4. A design drawing transmission means according to claim 1, wherein said design drawing is a drawing prepared by computer aided design (CAD).

5. A design drawing transmission system according to claim 1, further comprising a CAD system for preparing said design drawing using a computer and a first plotter for plotting said design drawing prepared by said CAD system on the recording sheet, wherein said output means in said design drawing receiving device comprises a second plotter for said design drawing on the recording sheet on the basis of said image signal.

6. A design drawing transmission system comprising:
a design drawing transmission device at a first facility including image reading means for reading a design drawing written on a recording sheet and producing an image signal representing said design drawing, first storage means for storing the image signal produced by said image reading means and a characteristic information indicative of a characteristic of said image reading means identifying the reading accuracy of the reading means, and transmission means for transmitting drawing information including the image signal and said characteristic information stored by said first storage means through a predetermined communication path; and,
a design drawing receiving device at a second facility including receiving means connected with said communication path for receiving the drawing information transmitted through said communication path, second storage means for storing the drawing information received by said receiving means, output means for reading out the drawing information stored by said second storage means and reproducing the design drawing on a recording sheet on the basis of the image signal and under the control of the characteristic information included in said drawing information which minimizes dimensional errors in a reproduced design drawing.

7. A design drawing transmission system according to claim 6, wherein said design drawing receiving device further comprises confirmation means for confirming that said drawing information means has been stored in said second storage means.

8. A design drawing transmission system according to claim 6, wherein said design drawing receiving device further comprises means for modifying a reproduction characteristic in reproduction of said image signal included in said drawing information by said output means on the basis of said characteristic information included in said drawing information transmitted by said transmission means.

9. A design drawing transmission system comprising:
a design drawing transmitting device at a first facility including image reading means for reading the design drawing drafted on a recording sheet and converting it into an image signal, characteristic adding means for adding characteristic information indicative of a characteristic of said image reading means to the image signal obtained by said image reading means thereby to produce drawing information, and transmission means for transmitting the drawing information produced by said characteristic adding means through a predetermined transmission path;
a design drawing receiving device at a second facility including receiving means for receiving the drawing information transmitted through said transmission path, storage means for storing the drawing information received by said receiving means, output means for reading out the drawing information stored by said storage means and reproducing the design drawing on a recording sheet on the basis of said image signal included in said drawing information, and
means for modifying reproduction characteristic in reproduction of said image signal by the output means on the basis of the characteristic information included in said drawing information to minimize dimensional errors in a reproduced design drawing.

10. A design drawing transmission system according to claim 9, wherein said design drawing receiving device further comprises confirmation means for confirming that said drawing information means has been stored in said storage means.

11. A design drawing transmission means according to claim 9, wherein said design drawing is a drawing prepared by computer aided design (CAD).

12. A design drawing transmission system comprising:
a design drawing transmission device of a first facility including a scanner housed in a first case for reading a design drawing drafted on a recording sheet and converting it into an image signal, first storage means housed in a second case for storing the image signal obtained by said scanner and a characteristic information indicative of the characteristic of said scanner, and first communication control means housed in a third case of transmitting drawing information including said image signal and characteristic information stored in said first storage means through a predetermined communication path; and,
a design drawing receiving device of a second facility including second communication means housed in a fourth case for receiving said drawing information transmitted through said communication path, second storage means housed in a fifth case for storing said drawing information received by said communication control means, and a plotter housed in a sixth case for reading out said drawing information stored in said second storage means and reproducing the design drawing on a recording sheet on the basis of the image signal and under control of the characteristic information included in said drawing information which minimizes dimensional errors in a reproduced design drawing.

13. A design drawing transmission system according to claim 12, wherein said design drawing receiving device further comprises confirmation means for confirming that said drawing information has been stored in said storage means.

14. A design drawing transmission system according to claim 12, wherein said design drawing transmission device further comprises characteristic adding means for adding said characteristic information to said image signal thereby producing the drawing information.

15. A design drawing transmission system according to claim 12, wherein said design drawing receiving device further comprises means for modifying a reproduction characteristic during reproduction of said drawing information by said output means on the basis of said characteristic information included in said drawing information transmitted by said transmission means.

16. A design drawing transmission means according to claim 12, wherein said design drawing is a drawing prepared by computer aided design (CAD).

17. A design drawing transmission system comprising:
- a design drawing transmitting device including image reading means for reading an original design drawing drafted on a recording sheet and converting it into an image signal, characteristic adding means for adding characteristic information indicative of a characteristic of said image reading means to the image signal obtained by said image reading means thereby preparing drawing information, and transmission means for transmitting the drawing information prepared by said characteristic adding means through a predetermined transmission path; and
- a design drawing receiving device including receiving means for receiving the drawing information transmitted through said transmission path, storage means for storing the drawing information received by said receiving means, output means for reading out the drawing information stored by said storage means and reproducing the design drawing on a recording sheet on the basis of said image signal included in said drawing information, and means for modifying a reproduction characteristic of the output means on the basis of the characteristic information included in said drawing information so that a dimension error of said design drawing reproduced by said output means with respect to said original design drawing is less than 0.5 mm per 1000 mm.

18. A design drawing transmission system comprising:
- a design drawing transmission device at a first facility including image reading means for reading a design drawing written on a recording sheet and producing an image signal, first storage means for storing the image signal produced by said image reading means and a characteristic information indicative of characteristics of said image reading means, transmission means for transmitting drawing information including the image signal stored by said first storage means through a predetermined communication path, and characteristic adding means for adding characteristic information indicative of characteristics of said image reading means to said image signal so that the drawing information transmitted by said transmission means includes said characteristic information; and,
- a design drawing receiving device at a second facility including receiving means connected with said communication path for receiving the drawing information transmitted through said communication path, second storage means for storing the drawing information received by said receiving means, output means for reading out the drawing information stored by said second storage means and reproducing the design drawing on a recording sheet on the basis of the image signal and under control of the characteristic information included in said drawing information which minimizes dimensional errors in a reproduced design drawing.

19. A design drawing transmission system according to claim 18, wherein said design drawing receiving device further comprises confirmation means for confirming that said drawing information has been stored in said storage means.

20. A design drawing transmission system comprising:
- a design drawing transmission device of a first facility including image reading means for reading a design drawing prepared on a recording sheet and producing an image signal, transmission means for transmitting drawing information including the image signal produced by said image reading means through a predetermined transmission path, and characteristic adding means for adding characteristic information indicative of characteristics of the image reading means to said image signal so that the drawing information transmitted by said transmission means includes said characteristic information; and,
- a design drawing receiving device of a second facility including receiving means for receiving the drawing information and characteristic information transmitted through said transmission path, storage means for storing the drawing information received by said receiving means, and output means for reading out the drawing information stored by said storage means and reproducing the design drawing on a recording sheet on the basis of the image signal and under control of the characteristic information included in said drawing information to maintain dimensional errors at a minimum.

21. A design drawing transmission system according to claim 20, wherein said design drawing receiving device further comprises confirmation means for confirming that said drawing information has been stored in said storage means.

22. A design drawing transmission system according to claim 20, wherein said design drawing receiving device further comprises means for modifying reproduction characteristics in reproduction of said image signal included in said drawing information transmitted by said transmission means.

23. A design drawing transmission system according to claim 20, wherein said design drawing is a drawing prepared by computer aided design (CAD).

24. A design drawing transmission system according to claim 20, further comprising a CAD system for preparing said design drawing using a computer and a first plotter for plotting said design drawing using a computer and a first plotter for plotting said design drawing prepared by said CAD system on the recording sheet, wherein said output means in said design drawing receiving device comprises a second plotter for said design drawing on the recording sheet on the basis of said image signal.

25. A design drawing transmission system comprising:
- a design drawing transmission device at a first facility including image reading means for reading a design drawing prepared on a recording sheet and producing an image signal, transmission means for transmitting drawing information including characteristic information indicative of the characteristic of the image reading means and the image signal produced by said image reading means through a predetermined transmission path; and,
- a design drawing receiving device at a second facility including receiving means for receiving the drawing information transmitted through said transmission path, storage means for storing the drawing information received by said receiving means, output means for reading out the drawing information stored by said storage means, and reproducing the design drawing on a recording sheet on the basis of the image signal included in said drawing information, and means for modifying reproduction characteristics in reproduction of said image signal included in said drawing information by said output means on the basis of said characteristic information included in said drawing information transmitted by said transmission means to minimize dimensional errors in a reproduced design drawing.

26. A design drawing transmission system according to claim 25, wherein said design drawing receiving device further comprises confirmation means for confirming that said drawing information has been stored in said storage means.

27. A design drawing transmission system according to claim 25, wherein said design drawing transmission device further comprises characteristic adding means for adding characteristic information indicative of the characteristic of the image reading means to said image signal so that the drawing information transmitted by said transmission means includes said characteristic information.

28. A design drawing transmission system according to claim 25, wherein said design drawing is a drawing prepared by computer aided design (CAD).

29. A design drawing transmission system comprising:
- a design drawing transmission device at a first facility including image reading means for reading a design drawing written; on a recording sheet and producing an image signal, first storage means for storing the image signal produced by said image reading means and a characteristic information indicative of characteristics of said image reading means, and transmission means for transmitting drawing information including the image signal stored by said first storage means through a predetermined communication path; and,
- a design drawing receiving device in a second facility including receiving means connected with said communication path for receiving the drawing information transmitted through said communication path, second storage means for storing the drawing information received by said receiving means, output means for reading out the drawing information stored by said second storage means and reproducing the design drawing on a recording sheet on the basis of the image signal included in said drawing information, and means for modifying reproduction characteristics in reproduction of said image signal included in said drawing information by said output means on the basis of said characteristic information included in said drawing information transmitted by said transmission means to minimize dimensional errors in a reproduced image.

30. A design drawing transmission system according to claim 29, wherein said design drawing receiving device further comprises confirmation means for confirming that said drawing information has been stored in said storage means.

31. A design drawing transmission system according to claim 29, wherein said design drawing transmission device further comprises characteristic adding means for adding characteristic information indicative of characteristics of the image reading means to said image signal so that the drawing information transmitted by said transmission means includes said characteristic information.

32. A design drawing transmission system for transmitting a design drawing between at least two separate facilities which are connected through a communication line, said system comprising:
- a design drawing transmission device provided at each of said facilities and including image reading means for reading a design drawing prepared on a recording sheet and producing an image signal;
- transmission means provided at each of said facilities for transmitting drawing information to one of the other sites via said communication line, said drawing information including characteristic information identifying a reading accuracy of the reading means and the image signal produced by said image reading means; and,
- a design drawing receiving device provided at each of said facilities and including receiving means for receiving the drawing information transmitted from one of the other sites through said communication line, storage means for storing the drawing information received by said receiving means, output means for reading out the drawing information stored by said storage means and reproducing the design drawing on a recording sheet on the basis of the image signal and under control of the characteristic information included in said drawing information which minimizes dimensional errors in a reproduced design drawing.

* * * * *